Aug. 14, 1951     I. JEPSON     2,564,644
FILTER ASSEMBLY FOR COFFEE MAKERS
Filed Sept. 13, 1946
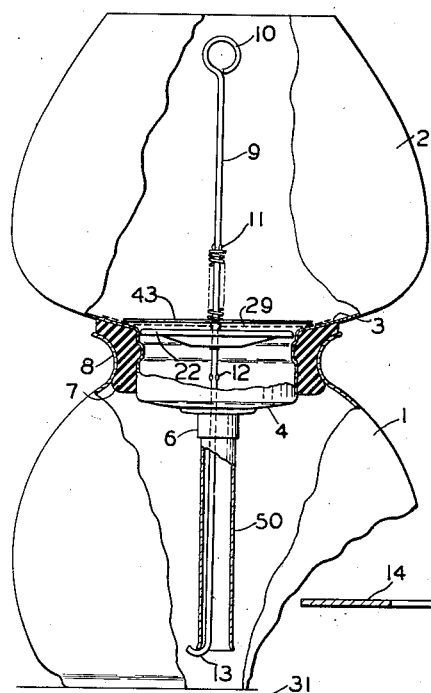
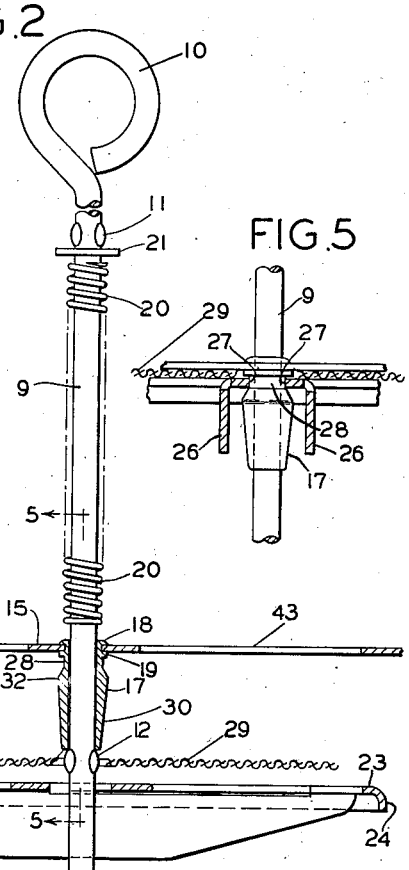
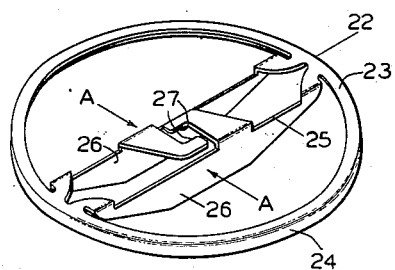
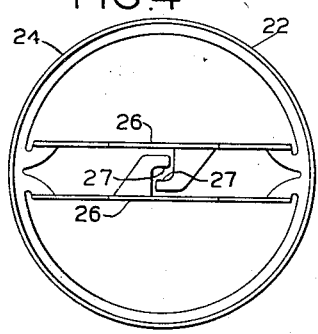
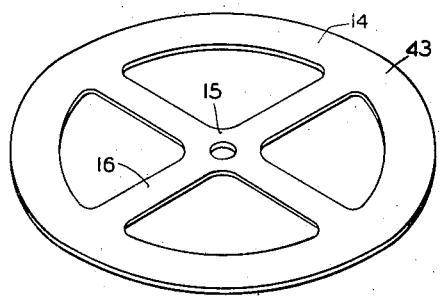
INVENTOR.
Ivar Jepson
BY McCanna & Morsbach
ATTORNEYS.

Patented Aug. 14, 1951

2,564,644

UNITED STATES PATENT OFFICE 2,564,644

FILTER ASSEMBLY FOR COFFEE MAKERS

Ivar Jepson, Oak Park, Ill., assignor to Sunbeam Corporation, Chicago, Ill., a corporation of Illinois Application September 13, 1946, Serial No. 696,680

11 Claims. (Cl. 210—162)

This invention relates to improvements in the kind of coffee maker commonly known as the vacuum type in which the water is heated in one container and transferred to another for contact with the ground coffee whereupon it is returned to the first container. The invention has especial reference to the filter assembly for such coffee makers.

One object of the invention is to provide an improved and simplified filter means that will insure the provision of clear coffee.

Another object of the invention is to provide an improved filter assembly having a filter cloth that may be conveniently and easily removed and replaced for cleaning purposes.

Another object of the invention is to provide a coffee maker having improved filter means of relatively large filter area with the view to decreasing the filtering time. The improved construction avoids the disadvantages of certain prior filter assemblies which utilize a basket type filter frame and a filter cloth held on the frame by means of a draw string, and provides a filter element of sheet material adapted to be clamped between upper and lower frame members in a manner to permit of quick and easy replacement.

Another object of the invention is the provision of a relatively large diameter filter assembly in coaction with a relatively large diameter sealing ring between the lower and upper vessels of the coffee maker with the view to obtaining improved clamping and sealing effects between the filter assembly and the upper vessel and between the upper and lower vessels.

Another object of the invention is to provide a secondary assembly for a coffee maker which is an improvement over the prior art as represented by the devices disclosed in Patents 2,345,262 and 2,345,265; one important feature of the present invention residing in the simplified mounting in which the conventional threaded mounting in the bottom of the coffee pot is dispensed with; and another important feature residing in the construction which permits the parts to be assembled merely by pushing them together by axial movement along a filter rod and permits the parts to be unlocked for disassembly merely by pressing two resilient members together, there being no threaded parts in the entire construction.

Other objects and attendant advantages will be appreciated by those skilled in this art as the invention becomes better understood by reference to the following description when considered in connection with the accompanying drawings, in which—

Figure 1 is a vertical section through a coffee maker embodying one construction of the invention;

Fig. 2 is an enlarged exploded fragmentary view of the filter assembly;

Fig 3 is a perspective view of the lower frame member;

Fig. 4 is a view of Fig. 3 from the under side;

Fig. 5 is a sectional view of Fig. 2 on the section line 5—5; and

Fig. 6 is a perspective view of the upper frame member.

The coffee maker shown more or less in outline is one known as the vacuum type which operates by the displacement of water from the coffee pot into another vessel containing the coffee grind. After mixing with the grind, the coffee is caused to return to the pot through the lowering of the temperature therein. Aside from the filter assembly, the coffee maker shown may be the same as that disclosed in Jepson Patent 2,312,555, issued March 6, 1943. Briefly, this type of coffee maker consists of a pot 1 and a coffee ground container or bowl 2 disposed above the pot 1. Heat is usually applied to the pot 1 by a built-in heating unit and a thermostatic mechanism which controls the heat during the coffee making operation. Where preferred, the pot 1 may comprise a simple vessel adapted to be heated by placing it on a hot plate or gas burner.

In the embodiment here shown for purposes of illustration, the bowl 2 is of generally symmetrical shape and has a substantially flat bottom 3 with a cup-shaped well 4 which terminates in a displacement tube 50 that is connected to the bowl by a threaded boss 6 which permits the removal of the tube for cleaning. A gasket 7 is mounted on the exterior of the well portion 4 of the bowl 2 to seat against an outwardly flared rim 8 of the pot 1 to provide a means for securing the bowl to the pot to form a steam-tight joint therebetween. In the present embodiment of the invention, the bowl 2 is secured tightly to the pot 1 solely by frictional engagement of the gasket with the pot rim or throat 8; thus dispensing with previously used threaded members extending through the bowl 2 and engaging an upstanding stud secured to the bottom of the pot as disclosed in the above-mentioned patents. To this end the gasket 7 will be formed of rubber or rubber-like material which, in addition to the desired compressibility, will possess the proper frictional characteristics to maintain the bowl 2 in place against steam pressures normally existing within the pot 1 during the coffee making operation.

As will be more fully described, the marginal portion of the filter assembly unit is pressed upon the annular bottom surface 3 of the bowl 2 as the rod 9 is hooked onto the bottom of the tube 50. An eyelet 10 formed on the upper end portion of the rod 9 provides convenient means for handling it so it may be fastened or removed from the tube 50. Spaced abutments 11 and 12 are provided at the central portion of the rod 9, the upper abutment 11 being located to exert downward pressure on the filter assembly as the rod 9 is pushed downwardly and its hooked bottom end 13 is caused to engage the bottom end of the tube 50.

The filter assembly consists of a lower frame 22 and an upper frame 43 associated on the rod 9. The upper frame 43 has a circular marginal portion 14 and a center portion 15 connected thereto by spokes 16. The center portion 15 is apertured and has a sleeve member 17 attached thereto by a pair of outwardly turned flanges 18 and 19 as best shown in Fig. 2. The sleeve 17 is slidably positioned on the rod 9 between the abutments 11 and 12. A helical spring member 20 is positioned on the rod 9 and bears at its bottom end upon the sleeve flange 18 and at its upper end on a seating washer 21 which in turn is engaged by the upper abutment 11. Normally, when the parts are disassembled, the lower abutment 12 serves to maintain the sleeve 17, spring 20, and washer 21 in place on the rod 9.

An important feature of the present invention resides in the construction of the lower frame 22 which is best shown in Figs. 3 and 4. It is of substantially the same shape as the upper frame 43, having a circularly extending marginal portion 23 with a downwardly extending cylindrical strengthening skirt 24. Said marginal portion is connected diametrically by a resilient portion 25, the latter comprising a pair of longitudinal struts 26 spaced on either side of the center and being formed at right angles to the plane of the marginal porion 23 for a maximum of traverse flexibility. Each of the struts 26 has formed thereon substantially in the same plane as the marginal portion 23 an L-shaped inward extension 26 having an edge 27 spaced on either side of the center. The parts are so arranged that in the unstressed condition the distance between the edges 27 is less than the diameter of the groove 28 formed in the sleeve 17 so that the lower frame 22 may be pushed axially upward along the tapered sleeve surface 30 and will be held in place by engagement within the groove 28 until this engagement is released by pressing the edges 27 apart by the application of a transverse force to the struts 26 (that is, in the direction of the arrows A in Fig. 3). The width of the sleeve flange 19 will be such that when the lower frame edges 27 are engaged by the groove 28 in the manner above described, there will still be room for interposing the cloth filter disk 29 between the two frame members. Another important feature of the present invention resides in the fact that the lower frame member 22 may be formed of a single piece of sheet material, preferably of a con-contaminating springy material such as stainless steel or the like. Both the lower and upper frames are of one piece stamped metal construction which provides sufficient flexibility to avoid their sitting in a distorted shape through continued use. Thus, when the marginal edge of the filter assembly unit is pressed against the annular bottom bowl surface 3 it will adapt itself to the bowl surface 3 to provide a tightly fitting seal therearound.

The filter cloth 29 will preferably be of a disk shape containing a center hole for insertion of the sleeve 17 and is held between the two frame members 43 and 22 when the lower frame member 22 and the filter disks 29 are pushed upward over the tapered sleeve surface 30. It will be observed that a marginal portion of the filter disk 29 is adapted to be interposed between the marginal portions 14 and 23 of the upper and lower frame members respectively. Thus, the interposed filter cloth is clamped in such a manner as to provide an effective seal against the passage of coffee grounds through the central opening of the filter cloth, an outer portion of the filter cloth 29 beyond the clamped portion being resiliently pressed into coffee-ground-sealing relation with the annular bowl surface 3 when the parts are assembled as shown in Figure 1.

In operation, the coffee grind will be placed in the bowl 2 and water will be placed in the pot 1. As the water is heated it will generate vapor or steam thereabove which will be effective to force the water upward in the tube 50 through the filter cloth 29 and into the bowl 2 until all of the water above the bottom of the tube 50 is displaced from the pot 1 into the bowl 2. Upon release of the pressure in the pot 1 by the lowering of its temperature, the coffee mixture in the bowl 2 will run downwardly through the filter assembly through the tube 50 to the pot 1, its grounds being filtered out by the filter cloth 29. It should be clear that the filter cloth including its extreme marginal edge 31 establishes a seal across the well 4 to prevent any coffee grounds from returning with the liquid coffee.

When all of the liquid has returned to pot 1, the bowl 2 is removed from the pot 1 by lifting it off by means of a suitable handle (not shown), thereby breaking the frictional engagement between the gasket 7 and the pot flared portion 8. The bowl 2, when removed, will contain the filter assembly as a unit, it being unnecessary to disturb the filter assembly in any way in removing the bowl 2 from the pot 1; thus, it will be observed that this operation will take place without disturbing the sealing relation of the filter cloth in any way with the bottom of the bowl, thereby eliminating the possibility of accidentally introducing particles of coffee grind into the clear coffee in the pot. The filter assembly may then be removed from the bowl 2 by grasping the eyelet 10 and pressing the rod 9 downwardly against the resistance of the spring 20 until the hooked end portion is disengaged from the bottom of the tube 50. The filter assembly may then be removed from the bowl and disassembled simply by pressing the strut members 26 of the lower frame member together until the edges 27 are pressed apart a distance exceeding the width of the tapered surface at 32 whereupon the lower frame member 22 and the used filter disk 29 may be removed by withdrawing them over the hooked end 13. Assembly of the parts is accomplished in the reverse manner whereupon the rod and filter assembly may be installed in the bowl and pot as previously described.

From the foregoing it will be apparent that the disk type filter cloth provided by the present invention is utilized in such a novel manner as to permit of quick and easy removal and replacement, thus facilitating keeping the filter clean so that the coffee will be clean and wholesome when made under normal operations. Another advantage of the present invention is in using an economical flat disk shaped filter element in combination with a filter assembly constituting a unit adapted to be inserted into and removed from the coffee maker for placing the filter element in its operative position and removing it therefrom together with means permitting quick and easy removal of the filter cloth from the unit. Another advantage is in the provision of a flat disk type filter in combination with a quickly detachable supporting structure so constructed and arranged for coaction only with the upper vessel of the coffee maker so as to provide a relatively large filter area together with lowering the filtering time and also to provide such a structure which dispenses with the necessity of providing a connection with the lower vessel.

Another important advantage of the present invention, aside from the improved simplicity of its construction, lies in the safety feature which prevents the build-up of steam pressure within the lower vessel sufficient to cause it to explode or blow off the upper vessel as has been experienced with certain prior constructions not possessing the present improvements. For example, if the filter cloth 29 is clogged from beneath, such as by the operator mistakenly placing the coffee grind in the pot 1 rather than in the bowl 2, the pressure exerted on the filter cloth will be sufficient to raise the entire filter assembly, sliding the sleeve 17 axially upward along the rod 9 against the resistance of the spring 20 to permit the water and coffee grounds to pass upward into the bowl through an annular passageway defined by the bottom marginal edge of the filter assembly and the annular bowl surface 3. This important safety feature will prevent the breaking of the steam-tight seal about the gasket 7 and will prevent the wedging and packing of the coffee grounds within the tube 50. It will be observed that this upward movement of the filter assembly is characterized by upward displacement of substantially the whole filter assembly along the rod 9 rather than upward displacement of a portion only of the upper frame member as has been employed in previous constructions, for example, as disclosed in the above mentioned Patent 2,345,262. An important advantage of this is that the pressure at which the filter assembly will be moved upwardly may be more accurately preselected simply by choosing a spring 20 of suitable strength. Through the provision of this safety feature which acts as a valve between the pot 1 and the bowl 2 it has been found that a liquid passage will always be provided therebetween through the tube 22 upon the existence of a predetermined pressure against the under side of the filter cloth 29. It has been found that even as a result of carelessness or mistake in placing the coffee grind in the lower pot instead of on the top of the filter assembly after the bowl 2 has been properly clamped in position, coffee grounds cannot be packed against the under side of the filter cloth to set up sufficient resistance to passage of the heated water and vapor upwardly through the filter that the increasing pressure resulting from the normal increase in heat during the coffee making operation will set up a dangerous condition, for at the preselected pressure determined by the strength of the spring 20 the collected material will pass around the filter and into the bowl 2 without danger to the structure or to any person nearby.

Various modifications may be made in the device embodying the present invention without departing from the spirit and scope thereof; and it will be obvious that minor changes in the invention will readily suggest themselves to others skilled in the art without departing from its spirit and scope. Having thus described the invention, what is claimed as new is:

1. A filter assembly for a coffee maker comprising a rod having axially spaced abutments, a sleeve freely slidable on said rod between said abutments, spring means urging said sleeve toward one of said abutments, an upper frame connected to said sleeve, a lower frame, a filter disk interposed between the frames and being imperforate except for a center opening to receive the sleeve, each frame having a surface near the center for clamping the interposed filter disk to provide an effective seal around its center opening, each frame having a marginal portion for engaging the filter disk and a perforate portion between its said clamping surface and its said marginal portion for passage of liquid through the filter, and means operative between the sleeve and the lower frame to detachably connect the lower frame in coaction with the upper frame to clamp the interposed filter disk between said surfaces, said means comprising a downwardly converging tapered portion on the lower end of the sleeve and a groove in the upper end of said portion together with opposed members carried by the lower frame resiliently separable with respect to each other and arranged to be so separated by engagement with said tapered portion of the sleeve upon movement of the lower frame upwardly axially of the sleeve, and said members being further arranged so that they will snap into said groove when the marginal portion of the lower member clamps the filter disk.

2. A filter assembly for a coffee maker comprising a rod having axially spaced abutments, a sleeve freely slidable on said rod between said abutments, spring means urging said sleeve toward one of said abutments, an upper frame fixed to said sleeve, a lower frame, and a filter disk interposed between the frames and being imperforate except for a center opening to receive the sleeve, each frame having a surface near the margin for clamping the interposed filter disk, said lower frame and said sleeve being removably engaged by means of coacting resiliently engaged groove and edge surfaces, the groove being formed in the sleeve and the edge surfaces each being formed on a resilient member arranged diametrically of the lower frame and integrally connected at its ends to said frame.

3. A filter assembly for a coffee maker comprising a rod having axially spaced abutments, a sleeve freely slidable on said rod between said abutments, spring means urging said sleeve toward one of said abutments, an upper frame fixed to said sleeve, a lower frame, a filter disk interposed between the frames and being imperforate except for a center opening to receive the sleeve, each frame having a marginal portion for engaging the filter disk and a perforate portion between its said clamping surface and its said marginal portion for passage of liquid through the filter, said sleeve having a groove thereon and said lower frame having a diametrical strut member integral at its ends with the marginal portion of the frame and formed medially of its ends to provide a spring-pressed edge adapted to be engaged in said groove for removably mounting said lower frame with respect to said upper frame and said filter disk.

4. A filter assembly for a coffee maker comprising a rod having axially spaced abutments, a sleeve freely slidable on said rod between said abutments, spring means urging said sleeve toward one of said abutments, an upper frame fixed to said sleeve, a lower frame, a filter disk interposed between the frames and being imperforate except for a center opening to receive the sleeve, each frame having a surface near the outer edge for clamping the interposed filter disk therebetween to provide an effective seal therebetween, said sleeve having an annular groove, said lower frame having a pair of resilient members diametrically connecting the marginal portions of the lower frame, each member shaped to provide an edge adapted to be engaged in said groove upon movement of the lower frame into clamping relation with the filter disk and arranged to be released from said groove by pressing said members together from opposite sides.

5. A filter assembly for a coffee maker comprising a rod having axially spaced abutments, a sleeve freely slidable on said rod between said abutments, spring means urging said sleeve toward one of said abutments, an upper frame fixed to said sleeve, a lower frame, a filter disk interposed between the frames and being imperforate except for a center opening to receive the sleeve, each frame having a marginal portion for engaging the filter disk and a perforate portion between its said clamping surface and its said marginal portion for passage of liquid through the filter, said sleeve having an annular groove, said lower frame having a pair of longitudinal spring members spaced on opposite sides of the center of said frame, said longitudinal spring members having edge portions engageable with said groove to removably mount said lower frame with respect to said upper frame.

6. A filter assembly for a coffee maker comprising a rod having axially spaced abutments, a sleeve freely slidable on said rod between said abutments, spring means urging said sleeve toward one of said abutments, an upper frame fixed to said sleeve, a lower frame, a filter disk interposed between the frames and being imperforate except for a center opening to receive the sleeve, said sleeve having an annular groove, said lower frame being formed of a single piece of spring material and having a continuous peripheral portion connected by a pair of struts formed by bending portions of the spring material at substantially right angles to the plane of said peripheral portion, each of said struts having a hooked portion removably engageable with said sleeve groove on a side opposite said strut whereby deflection of said struts toward one another causes said hooked portions to release their hold on said sleeve and causes said lower frame to be moved away from said upper frame by said spring means, the filter disk being held by and between the upper and lower frames when the lower frame is hooked to the sleeve and consequently to said upper frame.

7. A filter assembly for a coffee maker comprising a holding rod, opposed frames on the rod for supporting engagement with an interposed filter disk, means being connected to one of said frames at its center having a groove and a tapered portion leading to the groove, the other frame having a marginal portion adapted for supporting engagement with the filter disk and having diametrical resilient strut portions connected at their ends to said marginal portion and disposed on opposite sides of the rod, each strut portion being provided medially with a lateral extension having an edge portion arranged to engage said tapered portion and said groove at the side of the rod opposite from the strut, the parts being arranged so that said edge portions slidably engage said tapered portion upon relative axial movement of the frames with respect to each other to bring said edges into snap engagement with the groove when the filter disk is held between the frames and whereby the struts may be pressed together at their medial portions to withdraw the engaging edge portions from the groove to permit separation of the frames.

8. A filter assembly for a coffee maker as set forth in claim 7, in which the strut frame is stamped from a single piece of spring material providing a continuous marginal portion for supporting engagement with the filter disk, the strut portions being integral at their ends with said marginal portion and a major length of each strut portion being bent in angular relation to the plane of said frame to provide transverse flexibility at said medial portion to perform the groove engaging function.

9. A filter assembly for a coffee maker as set forth in claim 7, in which the strut frame is stamped from a single piece of spring material providing a continuous marginal portion for supporting engagement with the filter disk, the strut portions being integral at their ends with said marginal portion and a major length of each strut portion being bent in angular relation to the plane of said frame to provide transverse flexibility at said medial portion to perform the groove engaging function, and each strut portion being further formed by said stamping to provide lateral extensions terminating in said groove-engaging portions.

10. A filter assembly for a coffee maker comprising a holding rod, opposed frames on the rod for supporting engagement with an interposed filter disk, one of said frames having a marginal portion adapted for supporting engagement with the filter disk, and means operative between said frames to detachably connect one to the other including a diametrical resilient strut portion connected at its ends to said marginal portion and disposed at one side of the rod, said strut portion being provided medially with an integral edge portion arranged to detachably engage the other frame.

11. A filter assembly for a coffee maker comprising a holding rod, opposed frames on the rod for supporting engagement with an interposed filter disk, one of said frames having a marginal portion adapted for supporting engagement with the filter disk, and means operative between said frames to detachably connect one to the other including diametrical resilient strut portions connected at their ends to said marginal portion and disposed on opposite sides of the rod, each strut being provided medially with an edge portion arranged to detachably engage the other frame at the side of the rod opposite from the strut.

IVAR JEPSON.

REFERENCES CITED

The following references are of record in the file of this patent:

UNITED STATES PATENTS

| Number | Name | Date |
| --- | --- | --- |
| 2,171,321 | Miller | Aug. 29, 1939 |
| 2,269,956 | Renner | Jan. 13, 1942 |
| 2,345,262 | Jepson et al. | Mar. 28, 1944 |
| 2,345,265 | Jepson et al. | Mar. 28, 1944 |
| 2,388,335 | McCullough | Nov. 6, 1945 |

FOREIGN PATENTS

| Number | Country | Date |
| --- | --- | --- |
| 519,595 | Great Britain | Apr. 1, 1940 |